June 9, 1931.   J. D. LANGDON   1,808,990
AUTOMATIC COUPLER VALVE

Filed March 1, 1928

*J. D. Langdon*
INVENTOR.

Patented June 9, 1931

1,808,990

UNITED STATES PATENT OFFICE

JESSE D. LANGDON, OF LOS ANGELES, CALIFORNIA

AUTOMATIC COUPLER VALVE

Application filed March 1, 1928. Serial No. 258,402.

My invention relates to automatic valves, particularly for use with hose or sprinkler head connections.

One of the objects of the invention is to provide a novel valve for a hose or pipe coupler which is automatically opened when the coupler members are attached together.

Another object is the provision of such valve means which may be opened easily as the coupler members are brought together.

A further object is the provision of a coupler embodying a valve using a simple structure with few parts which may be readily assembled and separated.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1:
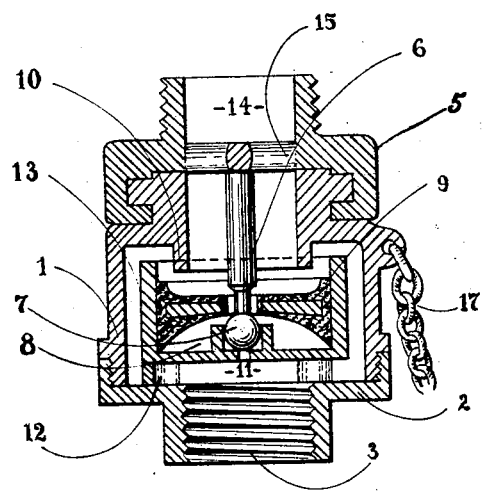
Figure 1 is a diametrical section of a coupler embodying the invention.
Figure 2:
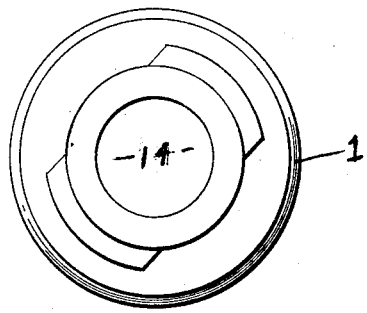
Fig. 2 is a plan view of the body or main member of the coupler.
Figure 3:
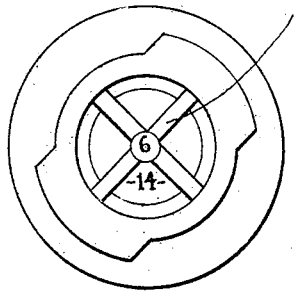
Fig. 3 is a plan view of the other member of the coupler.
Figure 4:
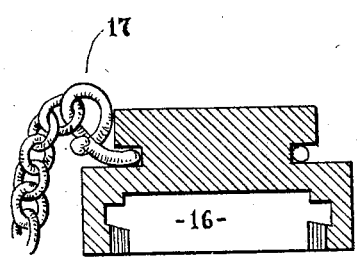
Fig. 4 is a diametrical section of a cap to be used in place of the member shown in Fig. 3.
Figure 5:
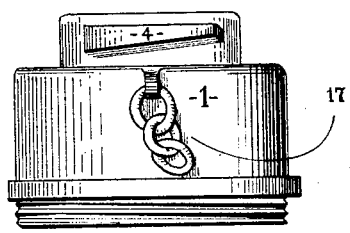
Fig. 5 is a side elevation of the body of the coupler.

One coupler member is composed of the body 1 and a cap 2 threadedly attached thereto and having an inlet 3 through which the water flows from a hose or pipe to which the cap 2 is attached.

The other coupler member 5 is adapted to slip over a reduced portion or neck of the body 1 which is provided with outstanding cam lugs 4 to be engaged by the member 5 when the two coupler members are rotated relatively to one another, to clamp said members together by the movement thereof axially toward one another. The body 1 and member 5 have registering outlet openings 14.

A cylinder or chamber 13 is disposed within the body 1, being attached, as at 12, to the cap 2, and said cylinder is spaced from the body 1 and cap 2 for the flow of water or fluid around said cylinder.

A piston valve member 9 is slidable in the cylinder 13 to and from a valve seat 10 of the body 1 surrounding the outlet opening 14 thereof, and a ball or relief valve 7 is disposed between the valve member 9 and an aperture 11 in the end of the cylinder confronting the inlet 3, the opposite end of the cylinder being open adjacent to the valve seat 10.

The valve member or piston 9 has a central opening through which a finger 6 may be projected, said finger being carried by a spider 15 in the member 5.

When the member 5 is detached from the body 1, the water or fluid flowing through the aperture 11 into the cylinder will move the valve member 9 against the seat 10 and the ball 7 against the valve member 9 across the central opening thereof, thereby preventing the discharge of water from the body 1.

When the members of the coupler are brought together, the finger 6 is moved through the opening of the valve member 9, thereby unseating the ball 7 from said valve member, which may be done with little force or effort due to the small area of the ball 7. This will relieve the pressure against the valve member 9 through the opening of said member which communicates with the outlet 14, and the ball 7 being moved across the aperture 11, will enable the valve member 9 to be moved open by the pressure of the water entering the open end of the cylinder and finding its way around the valve seat 10 to the outlet 14, with the parts in position as seen in Fig. 1.

When the coupler members are separated, the finger 6 being withdrawn, release the ball 7, and said ball is moved against the member 9 by water when flowing through the aperture 11, and the water pressure in the cylinder 13 then seats the member 9 against the seat 10.

A closure cap 16 is connected with the body 1 by means of a chain 17, and is attachable to the body 1 over the outlet opening thereof, in place of the member 5, for closing the outlet of said body.

I claim:

1. A coupler comprising a pair of coupler members, one having an inlet and a valve seat, a chamber in said coupling member having an aperture communicating with said inlet, a main valve member movable in said chamber to and from said seat and having an opening, a secondary valve member movable between said aperture and opening to close them alternately, and means carried by the other coupler member and arranged to move the secondary valve member from said opening to said aperture when the coupler members are brought together.

2. A coupler comprising a pair of coupler members, one of them having an inlet, an outlet and a valve seat surrounding the outlet, a cylinder in said coupler member having an open end adjacent to said valve seat and having an aperture in its opposite end communicating with said inlet, a piston valve member movable in the cylinder to and from said seat and having an opening communicating with said outlet, a secondary valve member movable between said opening and aperture to alternately close same, and a finger carried by the other coupler member and arranged to move the secondary valve member from said opening to said aperture when the coupler members are brought together.

3. A coupler comprising a pair of coupler members, a main valve member in one of the coupler members to close same and having an opening therein, said coupler member having an aperture therein, a secondary valve member disposed between said opening and said aperture, and means carried by the other coupler member to open the secondary valve member when the coupler members are brought together, said main valve member adapted to be closed and opened by fluid pressure within the first named coupler member when the secondary valve member is closed and opened, respectively.

4. A coupler comprising a pair of coupler members, pressure closed valve means for closing one of said members, said valve means comprising a main valve and a secondary valve disposed within the main valve, and valve opening means carried by the other coupler member to contact with said secondary valve to start the valve means open when said coupler members are brought together, said secondary valve adapted to relieve the pressure by the contact of said valve opening means before said valve means opens bodily.

5. A coupler comprising a pair of coupler members, pressure operated valve means in one of said members, said valve means comprising a main valve and a secondary valve disposed within the main valve, and valve opening means carried by the other coupler member to contact with said valve means to start the valve means open when said members are brought together, said valve means adapted to first relieve the pressure by the contact of said valve opening means before moving open bodily.

In testimony whereof I have signed my name to this specification.

JESSE D. LANGDON.